(12) United States Patent
Yu et al.

(10) Patent No.: US 9,906,162 B2
(45) Date of Patent: Feb. 27, 2018

(54) METHOD TO CONTROL THREE-PHASE INVERTER VOLTAGE

(71) Applicant: Caterpillar Inc., Peoria, IL (US)

(72) Inventors: Dachuan Yu, Dunlap, IL (US); Osama M. Alkhouli, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 117 days.

(21) Appl. No.: 15/143,053

(22) Filed: Apr. 29, 2016

(65) Prior Publication Data

US 2016/0248342 A1 Aug. 25, 2016

(51) Int. Cl.
*H02M 7/44* (2006.01)
*H02M 1/08* (2006.01)
*H02M 7/5387* (2007.01)

(52) U.S. Cl.
CPC .............. *H02M 7/44* (2013.01); *H02M 1/08* (2013.01); *H02M 7/53875* (2013.01); *H02M 2007/53876* (2013.01)

(58) Field of Classification Search
CPC ....................................................... H02M 7/44
USPC ................................. 318/809, 807, 767, 727
See application file for complete search history.

(56) References Cited

U.S. PATENT DOCUMENTS

| 4,020,360 | A | 4/1977 | Udvardi-Lakos |
| 5,883,796 | A | 3/1999 | Cheng et al. |
| 6,703,809 | B2 * | 3/2004 | Royak ..................... H02P 6/185 318/727 |
| 8,385,096 | B2 | 2/2013 | Yuzurihara et al. |

FOREIGN PATENT DOCUMENTS

| CN | 104764922 | 7/2015 |
| CN | 104811067 | 7/2015 |
| EP | 2672621 | 12/2013 |
| RU | 2442275 | 2/2012 |
| WO | 9944276 | 9/1999 |

* cited by examiner

*Primary Examiner* — David S Luo

(57) ABSTRACT

A method is provided to control the output voltage across an unbalanced load connected to a three-phase inverter, The method includes transformation of a set of three-phase voltage signals to a dq-coordinate system. Based on the transformation, a set of d-axis and a set of q-axis positive, negative and a set of zero sequence signals are generated. The method includes phase shifting of each of the zero sequence signals to generate 120 degrees and 240 degrees phase shifted zero sequence signals. Each of the zero sequence signals, the 120 degrees and the 240 degrees phase shifted zero sequence signals are transformed to a set of d-axis and q-axis zero sequence signals. A set of error signals, calculated based on the set of d-axis and q-axis zero, positive and negative sequence signals, are minimized and transformed to abc-coordinate system to obtain a three-phase control voltage signal.

1 Claim, 3 Drawing Sheets

METHOD TO CONTROL THREE-PHASE INVERTER VOLTAGE

TECHNICAL FIELD

The present disclosure relates to a three-phase inverter connected to a load. More particularly, the present disclosure relates to a method for controlling an output voltage across the load fed by the three-phase inverter.

BACKGROUND

A three-phase inverter supplying a load, especially in application areas such as, an uninterruptable power supply (UPS) is known in the art. If the load is balanced, a variety of control methods may be utilized to regulate a three-phase output voltage of the three-phase inverter. For example, the three-phase output voltage of the three-phase inverter supplying a balanced load may be regulated by use of one or more stationary frame proportional-integral (PI) controllers.

However, it is difficult to regulate the three-phase output voltage of the three-phase inverter by use of the one or more stationary frame PI controllers, when the three-phase inverter is supplying an unbalanced load. This is because the integral pails in atypical stationary frame PI controller are not able to compensate the effect of the unbalanced load. For example, the three-phase output voltage of the three-phase inverter across the unbalanced load is unbalanced due to undesired negative and zero sequence components of the three-phase output voltage. The negative sequence component is a stable component that can be eliminated by using the stationary frame PI controller. However, the stationary frame PI controller cannot eliminate the zero sequence component since it is a variable component. Thus, eliminating the zero sequence component in the three-phase output voltage of the three-phase inverter is difficult by using the stationary frame PI controller.

U.S. Pat. No. 5,883,796 discloses a method and apparatus for the dynamic series voltage restoration for sensitive loads in unbalanced power systems. is a recovery system for the unbalanced loads generated by faults in an existing balanced load system. This system introduce a compensator inverter that generates an inverter voltage signal in series with the power transmission line, which restores the positive sequence load voltage component to pre-fault conditions, and which cancels the negative and the zero sequence components of the load voltage signal. This system does not provide solution for the scenario where the three-phase inverter is feeding the unbalanced load.

Given description covers one or more problems existing in the art and discloses a method to solve the problem(s).

SUMMARY OF THE DISCLOSURE

In an aspect of the present disclosure, a method to control a three-phase output voltage of a three-phase inverter connected to a three-phase load is provided. The method includes transforming, by use of a controller, a three-phase command voltage signal to a dq-coordinate system in order to generate ad-axis and a q-axis positive sequence command signals, a d-axis and a q-axis negative sequence command signals, and a zero sequence command signal. The method further includes transforming, by use of the controller, a three-phase feedback voltage signal to the dq-coordinate system in order to generate a d-axis and a q-axis positive sequence feedback signals, a d-axis and a q-axis negative sequence feedback signals, and a zero sequence feedback signal. The method further includes phase shifting, by use of the controller, the zero sequence command signal to generate a 120 degrees phase shifted zero sequence command signal and a 240 degrees phase shifted zero sequence command signal. Similarly, the method further includes phase shifting, by use of the controller, the zero sequence feedback signal to generate a 120 degrees phase shifted zero sequence feedback signal and a 240 degrees phase shifted zero sequence feedback signal. The method further includes transforming, by use of the controller, the zero sequence command signal, the 120 degrees phase shifted zero sequence command signal, and the 240 degrees phase shifted zero sequence command signal to the dq-coordinate system in order to generate ad-axis and a q-axis zero sequence command signals. Similarly, the method further includes transforming, by use of the controller, the zero sequence feedback signal, the 120 degrees phase shifted zero sequence feedback signal, and the 240 degrees phase shifted zero sequence feedback signal to the dq-coordinate system in order to generate ad-axis and a q-axis zero sequence feedback signals. The method further includes generating, by use of the controller, a set of positive sequence control signals based on the d-axis and the q-axis positive sequence command and feedback signals. Similarly, the method further includes generating, by use of the controller, a set of negative sequence control signals based on the d-axis and the q-axis negative sequence command and feedback signals. The method further includes generating, by use of the controller, a set of zero sequence control signals based on the d-axis and the q-axis zero sequence command and feedback signals. The method further includes transforming, by use of the controller, the set of positive sequence control signals, the set of negative sequence control signals, and the set of zero sequence control signals from the dq-coordinate system to an abc-coordinate system. This transformation from the dq-coordinate system to the abc-coordinate system generates a three-phase positive sequence control signal, a three-phase negative sequence control signal, and a three-phase zero sequence control signal. The method further includes combining, by use of the controller, the respective abc-coordinates of the three-phase positive sequence control signals, the three-phase negative sequence control signals, and the three-phase zero sequence control signal to generate a balanced three-phase control voltage signal for controlling the three-phase output voltage of the three-phase inverter.

DETAILED DESCRIPTION

Figure 1:
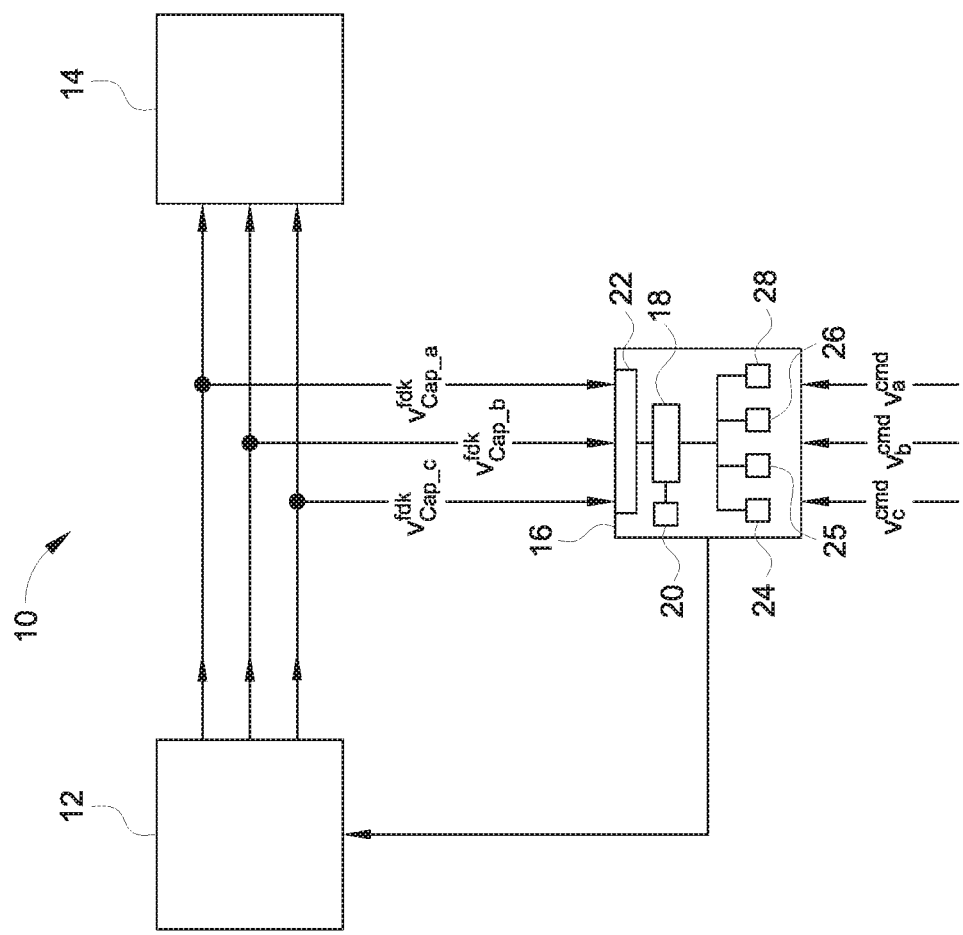
FIG. 1 is a block diagram that illustrates a system to control an output voltage across a load being fed by a three-phase inverter, in accordance with an embodiment of the present disclosure.

Referring to FIG. 1, a system 10 to control an output voltage across a load being fed by an inverter is illustrated. The system 10 includes a three-phase inverter 12, a load 14, and a controller 16. The three-phase inverter 12 is connected to the load 14 and the controller 16. The controller 16 is configured to control the three-phase inverter 12 such that a balanced three-phase output voltage is maintained across the load 14.

The three-phase inverter 12 is a commonly known three-phase power converter that may facilitate conversion of a. direct current (DC) voltage into an alternating current (AC) voltage, The three-phase inverter 12 may be realized by use of one or more suitable logics, circuitries, interfaces, and/or codes. More specifically, the three-phase inverter 12 includes three single-phase inverter switches (not shown in the figure), Further, each of the three single-phase inverter switches is coordinated to generate a three-phase output voltage.

A person having ordinary skills in the art will understand that the scope of the disclosure is not limited to the realization of the three-phase inverter 12 with the three single-phase inverter switches only, The three-phase inverter 12 may include more than three single-phase inverter switches. For example, the three-phase inverter 12 may include a fourth single-phase inverter switch (not shown in the figure). The fourth single-phase inverter switch may be connected to the three-phase load 14.

Further, each of the three single-phase inverter switches is connected to the load 14. In an embodiment, the load 14 may correspond to at least one of a single-phase load, a two-phase load, a three-phase load, or a combination thereof. Furthermore, the load 14 may correspond to an unbalanced load. The load 14 may include a varying impedance in each of the three phases. In a scenario where a load is connected to the three-phase inverter 12, a line phase of the load 14 draws a line current, from a respective phase of the three-phase inverter 12, which is different (in terms of magnitude and/or phase angle) from remaining line phases of the load 14. When the load 14 is unbalanced, the output voltage of the three-phase inverter 12 may not stay at a fixed value. The controller 16 controls the switching operation of the three-phase inverter 12 to maintain the balanced three-phase output voltage across the load 14.

The controller 16 may include one or more suitable logics, circuitries, interfaces, and/or codes that may be configured to execute a set of instructions to control the switching operation of the three-phase inverter 12. More specifically, the controller 16 includes one or more microprocessors, such as a microprocessor 18, one or more memories, such as a memory 20, one or more transceivers, such as a transceiver 22, one or more abc-to-dq0 transformers, such as an abc-to-dq0 transformer 24, one or more dq0-to-abc transformers, such as a dq0-to-abc transformer 25, one or more Proportional Integral (PI) controller units, such as a PI controller unit 26, and one or more phase shifter units, such as a phase shifter unit 28. Further, each of the microprocessor 18, the memory 20, the transceiver 22, the abc-to-dq0 transformer 24, the dq0-to-abc transformer 25, the PI controller unit 26, and the phase shifter unit 28 may be realized by use of one or more suitable logics, circuitries, interfaces, and/or codes that may he configured to execute a set of instructions to perform one or more associated operations.

Figure 2:
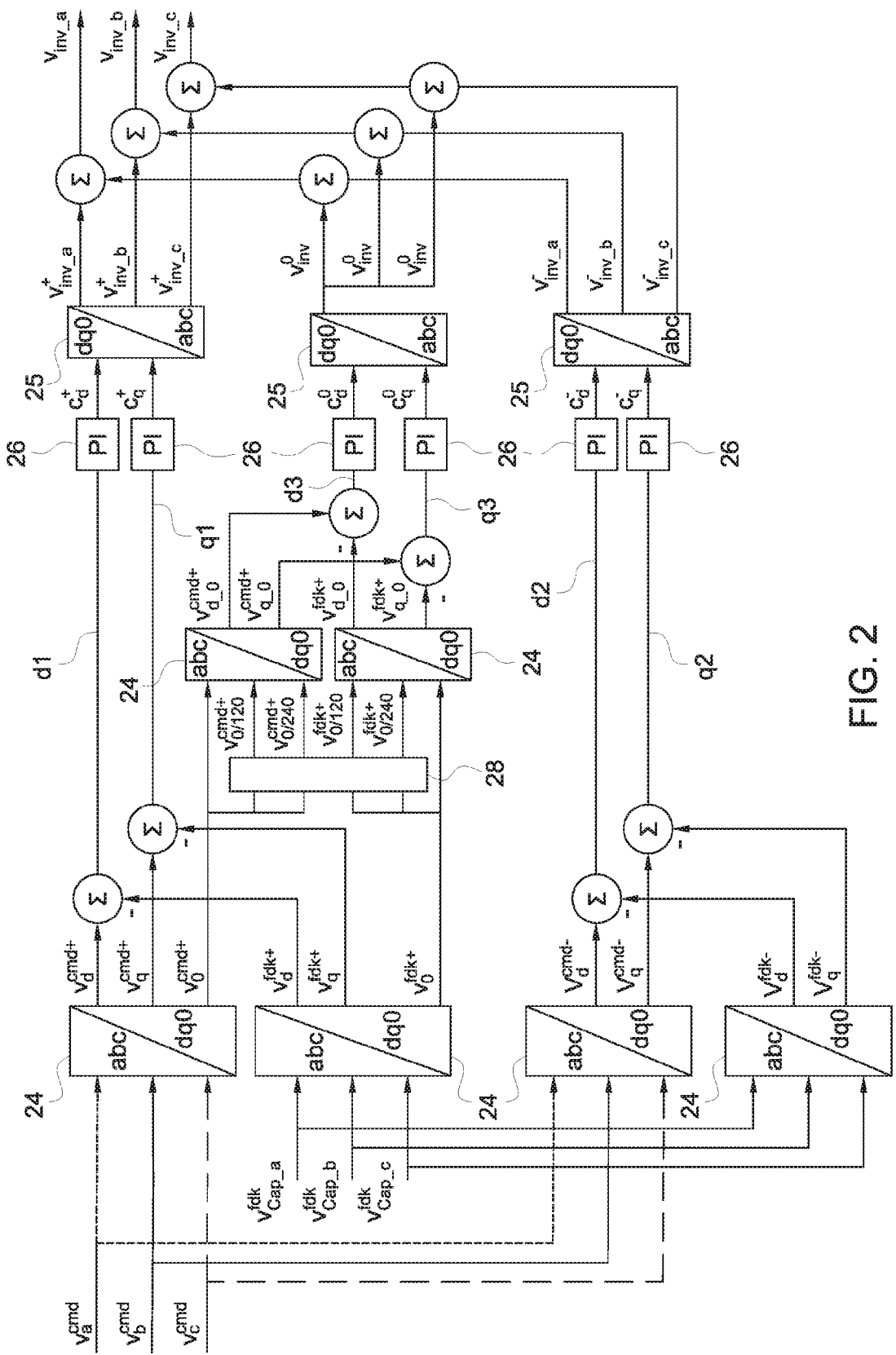
FIG. 2 is a block diagram that illustrates a controller to control a three-phase output voltage across the load being fed by the three-phase inverter, in accordance with an embodiment of the present disclosure.

FIG. 2 shows a schematic view of the controller 16. The controller 16 is configured to control the three-phase output voltage across the load 14 that is being fed by the three-phase inverter 12. Hereinafter, the load 14 has been referred to as the unbalanced load 14. The unbalanced load 14 may be realized by use of at least one of one or more single-phase loads, one or more two-phase loads, a three-phase load, or a combination thereof.

In a scenario where the three-phase inverter 12 is supplying the unbalanced load 14, the transceiver 22 receives a three-phase feedback voltage signal (denoted by $V_{cap\_a}^{fdk}$, $V_{cap\_b}^{fdk}$ and $V_{cap\_c}^{fdk}$) from one or more sensors (not shown in the figures) connected across the unbalanced load 14. The three-phase feedback voltage signal (denoted by $V_{cap\_a}^{fdk}$, $V_{cap\_b}^{fdk}$ and $V_{cap\_c}^{fdk}$) may be transmitted to the transceiver 22 via a set of capacitors (not shown in figures). The transceiver 22 further receives a three-phase command voltage signal (denoted by $V_a^{cmd}$, $V_b^{cmd}$ and $V_c^{cmd}$) from a signal generator (not shown in the figures). The signal generator may be operable to generate the three-phase command voltage signal (denoted by $V_a^{cmd}$, $V_b^{cmd}$ $V_c^{cmd}$) from one or more reference voltage signals. Further, the transceiver 22 may store the three-phase feedback voltage signal (denoted by $V_{cap\_a}^{fdk}$, $V_{cap\_b}^{fdk}$ and $V_{cap\_c}^{fdk}$) and the three-phase command voltage signal (denoted by $V_a^{cmd}$, $V_b^{cmd}$ $V_c^{cmd}$) in the memory 20.

Further, the abc-to-dq0 transformer 24 is operable to transform the three-phase command voltage signal (denoted by $V_a^{cmd}$, $V_b^{cmd}$ $V_c^{cmd}$) to a dq-coordinate system. More specifically, in the dq-coordinate system, the abc-to-dq0 transformer 24 generates a d-axis and a q-axis positive sequence command signals (denoted by $V_d^{cmd+}$ and $V_q^{cmd+}$, respectively), a d-axis and a q-axis negative sequence command signals (denoted by $V_d^{cmd-}$ and $V_q^{cmd-}$, respectively), and a zero sequence command signal (denoted by $V_0^{cmd+}$). Similarly, the abc-to-dq0 transformer 24 is operable to transform the three-phase feedback voltage signal (denoted by $V_{cap\_a}^{fdk}$, $V_{cap\_b}^{fdk}$ and $V_{cap\_c}^{fdk}$) to the dq-coordinate system in order to generate a d-axis and a q-axis positive sequence feedback signals (denoted by $V_d^{fdk+}$ and $V_q^{fdk+}$, respectively), a d-axis and a q-axis negative sequence feedback signals (denoted by $V_d^{fdk-}$ and $V_q^{fdk-}$, respectively), and a zero sequence feedback signal (denoted by $V_0^{fdk+}$).

Further, the phase shifter unit 28 may include one or more suitable logics, circuitries, interfaces, and/or codes that may be configured to execute a set of instructions to shift a phase of an input signal to generate a phase shifted output signal. More specifically, the phase shifter unit 28 is operable to shift the phase of the zero sequence command signal (denoted by $V_0^{cmd+}$) by 120 degrees to generate a 120 degrees phase shifted zero sequence command signal (denoted by $V_{0/120}^{cmd+}$). Similarly, the phase shifter unit 28 is operable to shift the phase of the zero sequence command signal (denoted by $V_0^{cmd+}$) by 240 degrees to generate a 240 degrees phase shifted zero sequence command signal (denoted by $V_{0/240}^{cmd+}$). The phase shifter unit 28 is further operable to shift the phase of the zero sequence feedback signal (denoted by $V_0^{fdk+}$) by 120 degrees to generate a 120 degrees phase shifted zero sequence feedback signal (denoted by $V_{0/120}^{fdk+}$). Similarly, the phase shifter unit 28 is operable to shift the phase of the zero sequence feedback signal (denoted by $V_0^{fdk+}$) by 240 degrees to generate a 240 degrees phase shifted zero sequence feedback signal (denoted by $V_{0/240}^{fdk+}$).

Thereafter, the abc-to-dq0 transformer 24 is operable to transform the zero sequence command signal (denoted by $V_0^{cmd+}$) the 120 degrees phase shifted zero sequence command signal (denoted by $V_{0/120}^{fdk+}$), and the 240 degrees phase shifted zero sequence command signal (denoted by $V_{0/240}^{fdk+}$) to the dq-coordinate system. More specifically, based on such transformation in the dq-coordinate system, the abc-to-dq0 transformer 24 generates a d-axis and a q-axis zero sequence command signals (denoted by $V_{d\_0}^{cmd+}$ and $V_{q\_0}^{cmd+}$, respectively). Similarly, the abc-to-dq0 transformer 24 transforms the zero sequence feedback signal (denoted by $V_0^{fdk+}$), the 120 degrees phase shifted zero sequence feedback signal (denoted by $V_{0/120}^{fdk+}$), and the 240 degrees phase shifted zero sequence feedback signal (denoted by $V_{0/240}^{fdk+}$) to the dq-coordinate system in order to generate a d-axis and a q-axis zero sequence feedback signals (denoted by $V_{d\_0}^{fdk+}$ and $V_{q\_0}^{fdk+}$, respectively).

The microprocessor 18 is operable to determine a set of error signals based on at least a plurality of signals. The set of error signals may be determined based on the plurality of signals from the d-axis and the q-axis positive sequence command signals (denoted by $V_d^{cmd+}$ and $V_q^{cmd+}$, respectively) and the d-axis and the q-axis positive sequence feedback signals (denoted by $V_d^{fdk+}$ and $V_q^{fdk+}$, respectively). Similarly, the set of error signals may be determined based on the d-axis and the q-axis negative sequence command signals (denoted by $V_d^{cmd-}$ and $V_q^{cmd-}$, respectively), the d-axis and the q-axis negative sequence feedback signals (denoted by $V_d^{fdk-}$ and $V_q^{fdk-}$, respectively). Similarly, the set of error signals may be determined based on the d-axis and the q-axis zero sequence command signals (denoted by $V_{d\_0}^{cmd+}$ and $V_{q\_0}^{cmd+}$, respectively), and the d-axis and the q-axis zero sequence feedback signals (denoted by $V_{d\_0}^{fdk+}$ and $V_{q\_0}^{fdk+}$, respectively).

More specifically, the set of error signals includes a first d-axis error signal (denoted by d1), a second d-axis error signal (denoted by d2), a third d-axis error signal (denoted by d3), a first q-axis error signal (denoted by q1), a second q-axis error signal (denoted by q2), and a third q-axis error signal (denoted by q3). The microprocessor 18 may be operable to determine the first d-axis error signal (denoted by d1) based on the d-axis positive sequence command signal (denoted by $V_d^{cmd+}$) and the d-axis positive sequence feedback signal (denoted by $V_d^{fdk+}$). The microprocessor 18 may further be operable to determine the first q-axis error signal (denoted by q1) based on the q-axis positive sequence command signal (denoted by $V_q^{cmd+}$) and the q-axis positive sequence feedback signal (denoted by $V_q^{fdk+}$). The microprocessor 18 may further be operable to determine the second d-axis error signal (denoted by d2) based on the d-axis negative sequence command signal (denoted by and the d-axis negative sequence feedback signal (denoted by $V_d^{cmd-}$), The microprocessor 18 may further be operable to determine, the second q-axis error signal (denoted by q2) based on the q-axis negative sequence command signal (denoted by $V_q^{cmd-}$) and the q-axis negative sequence feedback signal (denoted by $V_q^{cmd-}$). The microprocessor 18 may further be operable to determine the third d-axis error signal (denoted by d3) based on the d-axis zero sequence command signal (denoted by $V_{d\_0}^{cmd+}$) and the d-axis zero sequence feedback signal (denoted by $V_d^{fdk-}$). The microprocessor 18 may further be operable to determine the third q-axis error signal (denoted by q3) based on the q-axis zero sequence command signal (denoted by $V_{q\_0}^{cmd+}$) and the q-axis zero sequence feedback signal (denoted by $V_{q\_0}^{fdk+}$).

After the determination of the set of error signals (denoted by d1, d2, d3, q1, q2 and q3), the PI controller unit 26 is operable to generate a set of positive sequence control signals (denoted by $C_d^+$ and $C_q^+$, a set of negative sequence control signals (denoted by $C_d^-$ and $C_q^-$), and a set of zero sequence control signals (denoted by $C_d^0$ and $C_q^0$). The PI controller unit 26 is operable to generate the set of positive sequence control signals (denoted by $C_d^+$ and $C_q^+$) based on the first d-axis error signal (denoted by d1) and the first q-axis error signal (denoted by q1), respectively. Similarly, the PI controller unit 26 is operable to generate the set of negative sequence control signals (denoted by $C_d^-$ and $C_q^-$) based on the second d-axis error signal (denoted by d2) and the second q-axis error signal (denoted by q3), respectively. Similarly, the PI controller unit 26 is operable to generate the set of zero sequence control signals (denoted by $C_d^0$ and $C_q^0$) based on the third d-axis error signal (denoted by d3) and the third q-axis error signal (denoted by q3), respectively. Thereafter, the microprocessor 18 may be operable to transmit each of the set of positive sequence control signals (denoted by $C_d^+$ and $C_q^+$), the set of negative sequence control signals (denoted by $C_d^-$ and $C_q^-$)), and the set of zero sequence control signals (denoted by $C_d^0$ and $C_q^0$) to the dq0-to-abc transformer 25.

The dq0-to-abc transformer 25 is operable to transform each of the set of positive sequence control signals (denoted by $C_d^+$ and $C_q^+$), the set of negative sequence control signals (denoted by $C_d^-$ and $C_q^-$), and the set of zero sequence control signals (denoted by $C_d^0$ and $C_q^0$) from the dq-coordinate system to the abc-coordinate system. Mote specifically, the dq0-to-abc transformer 25 is operable to transform the set of positive sequence control signals (denoted by $C_d^+$ and $C_q^+$) to generate a three-phase positive sequence control signal (denoted by $V_{inv\_a}^+$, $V_{inv\_b}^+$ and $V_{inv\_c}^+$). Similarly, the dq0-to-abc transformer 25 is operable to transform the set of negative sequence control signals (denoted by $C_d^-$ and $C_q^-$) to generate a three-phase negative sequence control signal (denoted by $V_{inv\_a}^-$, $V_{inv\_b}^-$ and $V_{inv\_c}^-$). Similarly, the dq0-to-abc transformer 25 is operable to transform the set of zero sequence control signals (denoted by $C_d^0$ and $C_q^0$) in order to generate a three-phase zero sequence control signal (denoted by $V_{inv}^0$).

Thereafter, the microprocessor 18 is operable to combine the respective abc-coordinates of the three-phase positive sequence control signal (denoted by $V_{inv\_a}^+$, $V_{inv\_b}^+$ and $V_{inv\_c}^+$), the three-phase negative sequence control signal (denoted by $V_{inv\_a}^-$, $V_{inv\_b}^-$ and $V_{inv\_c}^-$), and the three-phase zero sequence control signal (denoted by $V_{inv}^0$). Based on at least the combination, the microprocessor 18 is operable to generate a balanced three-phase control voltage signal (denoted by $V_{inv\_a}$, $V_{inv\_b}$ and $V_{inv\_c}$). The microprocessor 18 is further operable to utilize the balanced three-phase control voltage signal (denoted by $V_{inv\_a}$, $V_{inv\_b}$ and $V_{inv\_c}$) to control the three-phase output voltage of the three-phase inverter 12 across the unbalanced load 14.

INDUSTRIAL APPLICABILITY

Figure 3:
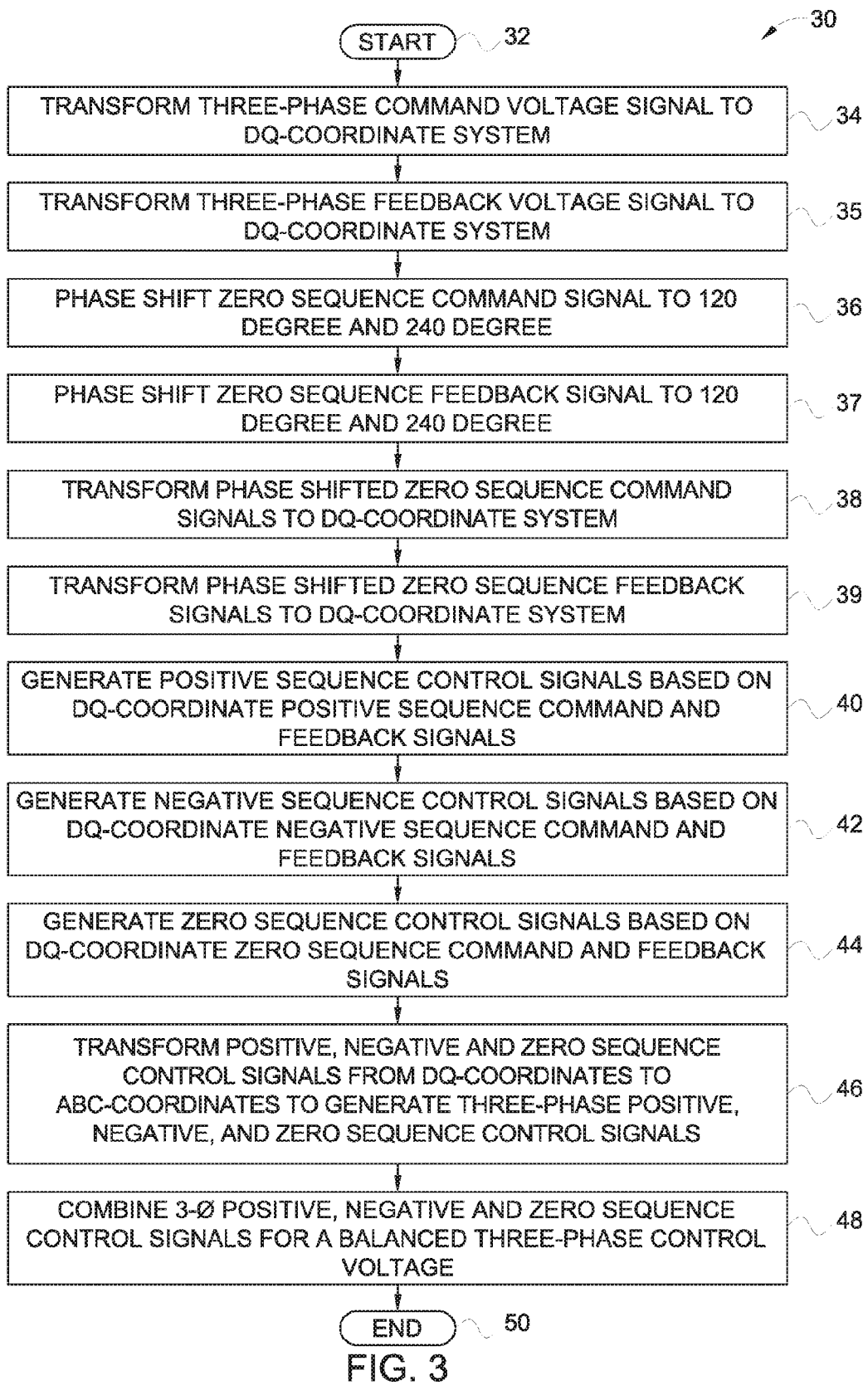
FIG. 3 is a flow chart that illustrates a method for controlling the three-phase output voltage across the load being fed by the three-phase inverter, in accordance with an embodiment of the present disclosure.

In operation, a disclosed method controls the three-phase output voltage across the load 14 being fed by the three-phase inverter 12. Referring to FIG. 3, there is shown a flow chart 30 for the disclosed method. The flow chart 30 is described in conjunction with FIG. 1 and FIG. 2. The method starts at step 32 and proceeds to step 34.

At step 34, the three-phase command voltage signal (denoted by $V_a^{cmd}$, $V_b^{cmd}$ and $V_c^{cmd}$) is transformed to the dq-coordinate system. In an embodiment, the controller 16 is operable to transform the three-phase command voltage signal (denoted by $V_a^{cmd}$, $V_b^{cmd}$ and $V_c^{cmd}$) to the dq-coordinate system. Based on the transformation, the controller 16 is operable to generate the d-axis and the q-axis positive sequence command signals (denoted by $V_d^{cmd+}$ and $V_q^{cmd+}$ respectively), the d-axis and the q-axis negative sequence command signals (denoted by $V_d^{cmd-}$ and $V_q^{cmd-}$, respectively), and the zero sequence command signal (denoted by $V_0^{cmd+}$).

Similarly, at step 35, the three-phase feedback voltage signal (denoted by $V_{cap\_a}^{fdk}$, $V_{cap\_b}^{fdk}$ and $V_{cap\_c}^{fdk}$) is transformed to the dq-coordinate system. In an embodiment, the controller 16 is operable to transform the three-phase feedback voltage signal (denoted by $V_{cap\_a}^{fdk}$, $V_{cap\_b}^{fdk}$ and $V_{cap\_c}^{fdk}$) to the dq-coordinate system. Based on the transformation, the controller 16 is operable to generate the d-axis and the q-axis positive sequence feedback signals (denoted by $V_d^{fdk+}$ and $V_q^{fdk+}$, respectively), the d-axis and the q-axis negative sequence feedback signals (denoted by $V_d^{fdk-}$ and $V_q^{fdk-}$, respectively) and the zero sequence feedback signal (denoted by $V_0^{fdk+}$).

At step 36, the zero sequence command signal (denoted by $V_0^{cmd+}$) is phase shifted by each of 120 degrees and 240 degrees. In an embodiment, the controller 16 is operable to shift the phase of the zero sequence command signal (denoted by $V_0^{cmd+}$) by each of the 120 degrees and the 240 degrees. Based on the phase shifting, the controller 16 is operable to generate the 120 degrees phase shifted zero sequence command signal (denoted by $V_{0/120}^{cmd+}$) and the 240 degrees phase shifted zero sequence command signal (denoted by $V_{0/240}^{cmd+}$).

Similarly, at step 37, the zero sequence feedback signal (denoted by $V_0^{fdk+}$) is phase shifted by each of 120 degrees and 240 degrees. In an embodiment, the controller 16 is operable to shift the phase of the zero sequence feedback signal (denoted by $V_0^{fdk+}$) by each of the 120 degrees and the 240 degrees. Based on the phase shifting, the controller 16 is operable to generate the 120 degrees phase shifted zero sequence feedback signal (denoted by $V_{0/120}^{cmd+}$) and the 240 degrees phase shifted zero sequence feedback signal (denoted by $V_{0/240}^{cmd+}$).

At step 38, the zero sequence command signal (denoted by $V_0^{cmd+}$), the 120 degrees phase shifted zero sequence command signal (denoted by $V_{0/120}^{cmd+}$) and the 240 degrees phase shifted zero sequence command signal (denoted by $V_{0/240}^{cmd+}$) are transformed to the dq-coordinate system. In an embodiment, the controller 16 is operable to transform the zero sequence command signal (denoted by $V_0^{cmd+}$), the 120 degrees phase shifted zero sequence command signal (denoted by $V_{0/120}^{cmd+}$) and the 240 degrees phase shifted zero sequence command signal (denoted by $V_{0/240}^{cmd+}$) to the dq-coordinate system. Based on the transformation, the controller 16 is operable to generate the d-axis and the q-axis zero sequence command signals (denoted by $V_{d\_0}^{cmd+}$ and $V_{q\_0}^{cmd+}$, respectively).

Similarly, at step 39, the zero sequence feedback signal (denoted by $V_0^{fdk+}$ the 120 degrees phase shifted zero sequence feedback signal (denoted by $V_{0/120}^{fdk+}$) and the 240 degrees phase shifted zero sequence feedback signal (denoted by $V_{0/240}^{fdk+}$) are transformed to the dq-coordinate system. In an embodiment, the controller 16 is operable to transform the zero sequence feedback signal (denoted by $V_0^{fdk+}$) the 120 degrees phase shifted zero sequence feedback signal (denoted by $V_{0/120}^{fdk+}$) and the 240 degrees phase shifted zero sequence feedback signal (denoted by $V_{0/240}^{fdk+}$) to the dq-coordinate system. Based on the transformation, the controller 16 is operable to generate the d-axis and the q-axis zero sequence feedback signals (denoted by $V_{d\_0}^{fdk+}$ and $V_{q\_0}^{fdk+}$ respectively).

At step 40, the set of positive sequence control signals (denoted by $C_d^+$ and $C_q^+$) is generated, In an embodiment, the controller 16 is operable to generate the set of positive sequence control signals (denoted by $C_d^+$ and $C_q^+$). The controller 16 may generate the set of positive sequence control signals (denoted by $C_d^+$ and $C_q^+$), based on the d-axis and the q-axis positive sequence command signals (denoted by $V_d^{cmd+}$ and $V_d^{cmd+}$, respectively) and the d-axis and the q-axis positive sequence feedback signals (denoted by $V_d^{fdk+}$ and $V_d^{fdk+}$, respectively).

Similarly, at step 42, the set of negative sequence control signals (denoted by $C_d^-$ and $C_q^-$) is generated. In an embodiment, the controller 16 is operable to generate the set of negative sequence control signals (denoted by $C_d^-$ and $C_q^-$). The controller 16 may generate the set of negative sequence control signals (denoted by ($C_d^-$ and $C_q^-$) based on the d-axis and the q-axis negative sequence command signals (denoted by $V_d^{cmd-}$ and $V_d^{cmd-}$, respectively) and the d-axis and the q-axis negative sequence feedback signals (denoted by $V_d^{fdk-}$ and $V_d^{fdk-}$, respectively).

Similarly, at step 44, the set of zero sequence control signals (denoted by $C_d^0$ and $C_q^0$) is generated. In an embodiment, the controller 16 is operable to generate the set of zero sequence control signals (denoted by $C_d^0$ and $C_q^0$). The controller 16 may generate the set of zero sequence control signals (denoted by $C_d^0$ and $C_q^0$) based on the d-axis and the q-axis zero sequence command signals (denoted by $V_{d\_0}^{cmd+}$ and $V_{q\_0}^{cmd+}$, respectively) and the d-axis and the q-axis zero sequence feedback signals (denoted by $V_{d\_0}^{cmd+}$ and $V_{q\_0}^{cmd+}$, respectively).

At step 40, step 42 and step 44, the set of positive sequence control signals (denoted by $C_d^+$ and $C_q^+$), the set of negative sequence control signals (denoted by $C_d^-$ and $C_q^-$) and the set of zero sequence control signals (denoted by $C_d^0$ and $C_q^0$) are generated based on the set of error signals. The controller 16 is operable to generate the set of positive sequence control signals (denoted by $C_d^+$ and $C_q^+$) based on the first d-axis error signal (denoted by d1) and the first q-axis error signal (denoted by q1), respectively. Similarly, the controller 16 is operable to generate the set of negative sequence control signals (denoted by $C_d^-$ and $C_q^-$) based on the second d-axis error signal (denoted by d2) and the second q-axis error signal (denoted by q3). respectively. Similarly, the controller 16 is operable to generate the set of zero sequence control signals (denoted by $C_d^0$ and $C_q^0$) based on the third d-axis error signal (denoted by d3) and the third q-axis error signal (denoted by q3), respectively.

At step 46, the set of positive sequence control signals (denoted by $C_d^+$ and $C_q^+$), the set of negative sequence control signals (denoted by $C_d^-$ and $C_q^-$), and the set of zero sequence control signals (denoted by $C_d^0$ and $C_q^0$) are transformed from the dq-coordinate system to the abc-coordinate system. In an embodiment, the controller 16 is operable to transform the set of positive sequence control signals (denoted by $C_d^+$ and $C_q^+$), the set of negative sequence control signals (denoted by $C_d^-$ and $C_q^-$), and the set of zero sequence control signals (denoted by $C_d^0$ and $C_q^0$) from the dq-coordinate system to the abc-coordinate system. Based on the transformation, the controller 16 is operable to generate the three-phase positive sequence control signal (denoted by $V_{inv\_a}^+$, $V_{inv\_b}^+$ and $V_{inv\_c}^+$), the three-phase negative sequence control signal (denoted by $V_{inv\_a}^-$, $V_{inv\_b}^-$ and $V_{inv\_c}^-$)) and the three-phase zero sequence control signal (denoted by $V_{inv}^0$).

At step 48, the respective abc-coordinates of the three-phase positive sequence control signal (denoted by $V_{inv_a}^+$, $V_{inv_b}^+$ and $V_{inv_c}^+$), the three-phase negative sequence control signal (denoted $V_{inv_a}^-$, $V_{inv_b}^-$ and $V_{inv_c}^-$), and the three-phase zero sequence control signal (denoted by $V_{inv}^0$) are combined. In an embodiment, the controller 16 is operable in combine the respective abc-coordinates of the three-phase positive sequence control signal (denoted by $V_{inv_a}^+$, $V_{inv_b}^+$ and $V_{inv_c}^+$), the three-phase negative sequence control signal (denoted by $V_{inv_a}^-$, $V_{inv_b}^-$ and $V_{inv_c}^-$), and the three-phase zero sequence control signal (denoted by $V_{inv}^0$).

The method 30 facilitates regulated output of the three-phase inverter 12, feeding the unbalanced load 14, using the three-phase balanced voltage signal (denoted by $V_{inv\_a}$, $V_{inv\_b}$ and $V_{inv\_c}$) in the system 10. More specifically, the controller 16 of the system 10 is operable to utilize the balanced three-phase control voltage signal (denoted by $V_{inv\_a}$, $V_{inv\_b}$ and $V_{inv\_c}$) to regulate the three-phase output voltage of the three-phase inverter 12 across the unbalanced load 14.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of the disclosure. Such embodiments should be understood to fall within the scope of the present disclosure as determined based upon the claim(s) and any equivalents thereof.

What is claimed is:

1. A method for controlling a three-phase output voltage of a three-phase inverter connected to aloud, the method comprising:

transforming, using a controller, a three-phase command voltage signal to a dq-coordinate system in order to generate a d-axis and a q-axis positive sequence command signals, a d-axis and a q-axis negative sequence command signals, and a zero sequence command signal;

transforming, using the controller, a three-phase feedback voltage signal to the dq-coordinate system in order to generate ad-axis and a q-axis positive sequence feedback signals, a d-axis and a q-axis negative sequence feedback signals, and a zero sequence feedback signal;

phase shifting, using the controller, the zero sequence command signal to generate a 120 degrees phase shifted zero sequence command signal, and a 240 degrees phase shifted zero sequence command signal;

phase shifting, using the controller, the zero sequence feedback signal to generate a 120 degrees phase shifted zero sequence feedback signal, and a 240 degrees phase shifted zero sequence feedback signal;

transforming, using the controller, the zero sequence command signal, the 120 degrees phase shifted zero sequence command signal and the 240 degrees phase shifted zero sequence command signal to the dq-coordinate system in order to generate a d-axis and a q-axis zero sequence command signals;

transforming, using the controller, the zero sequence feedback signal, the 120 degree phase shifted zero sequence feedback signal and the 240 degree phase shifted zero sequence feedback signal to the dq-coordinate system in order to generate a d-axis and a q-axis zero sequence feedback signals;

generating, using the controller, a set of positive sequence control signals, a set of negative sequence control signals, and a set of zero sequence control signals, wherein the set of positive sequence control signals are generated based on the d-axis and the q-axis positive sequence command signals and the d-axis and the q-axis positive sequence feedback signals, the set of negative sequence control signals are generated based on the d-axis and the q-axis negative sequence command signals and the d-axis and the q-axis negative sequence feedback signals, and the set of zero sequence control signals are generated based on the d-axis and the q-axis zero sequence command signals and the d-axis and the q-axis zero sequence feedback signals;

transforming, using the controller, the set of positive sequence control signals, the set of negative sequence control signals, and the set of zero sequence control signals from the dq-coordinate system to a abc-coordinate system in order to generate a three-phase positive sequence control signal, a three-phase negative sequence control signal, and a three-phase zero sequence control signal; and combining, using the controller, the respective abc-coordinates of the three-phase positive sequence control signal, the three-phase negative sequence control signal, and the three-phase zero sequence control signal to generate a balanced three-phase control voltage signal for controlling the three-phase output voltage of the three-phase inverter.

* * * * *